United States Patent [19]

Date

[11] Patent Number: 4,571,131

[45] Date of Patent: Feb. 18, 1986

[54] DEVICE FOR CLAMPING BORING BAR IN HORIZONTAL BORING AND MILLING MACHINE

[75] Inventor: Takao Date, Shizuoka, Japan

[73] Assignee: Toshiba Kikai Kabushiki Kaisha, Tokyo, Japan

[21] Appl. No.: 577,012

[22] Filed: Feb. 6, 1984

[30] Foreign Application Priority Data

Feb. 15, 1983 [JP]  Japan .............................. 58-20687[U]

[51] Int. Cl.$^4$ ............................................... B23C 1/02
[52] U.S. Cl. ..................................... 409/209; 29/1 A; 279/2 A; 279/4; 408/239 R; 409/231; 409/241
[58] Field of Search ............... 409/231, 232, 233, 234, 409/206, 207, 209, 241; 29/26 A, 27 C, 1 A, 568; 279/2 R, 2 A, 4; 269/48.1; 242/72 R, 72 B; 82/44; 408/239 R

[56] References Cited

U.S. PATENT DOCUMENTS

| 3,244,028 | 4/1966 | Dever et al. | 409/231 X |
| 3,516,328 | 6/1970 | Jones et al. | 409/231 |
| 3,830,509 | 8/1974 | Weber | 279/2 A |
| 3,904,143 | 9/1975 | Kullander | 242/72 B |
| 4,417,312 | 4/1979 | Secor et al. | 242/72 R |

Primary Examiner—Z. R. Bilinsky
Attorney, Agent, or Firm—Stevens, Davis, Miller & Mosher

[57] ABSTRACT

A device for clamping boring bar in a horizontal boring and milling machine comprises a resilient clamping ring interposed between a milling spindle and the boring bar, and an accumulator secured to the milling spindle for supplying pressurized oil to the clamping ring. An oil supply unit is provided for controlling oil supplied into the accumulator when the milling spindle is stopped at a predetermined angular position relative to a stationary part of the machine.

2 Claims, 1 Drawing Figure

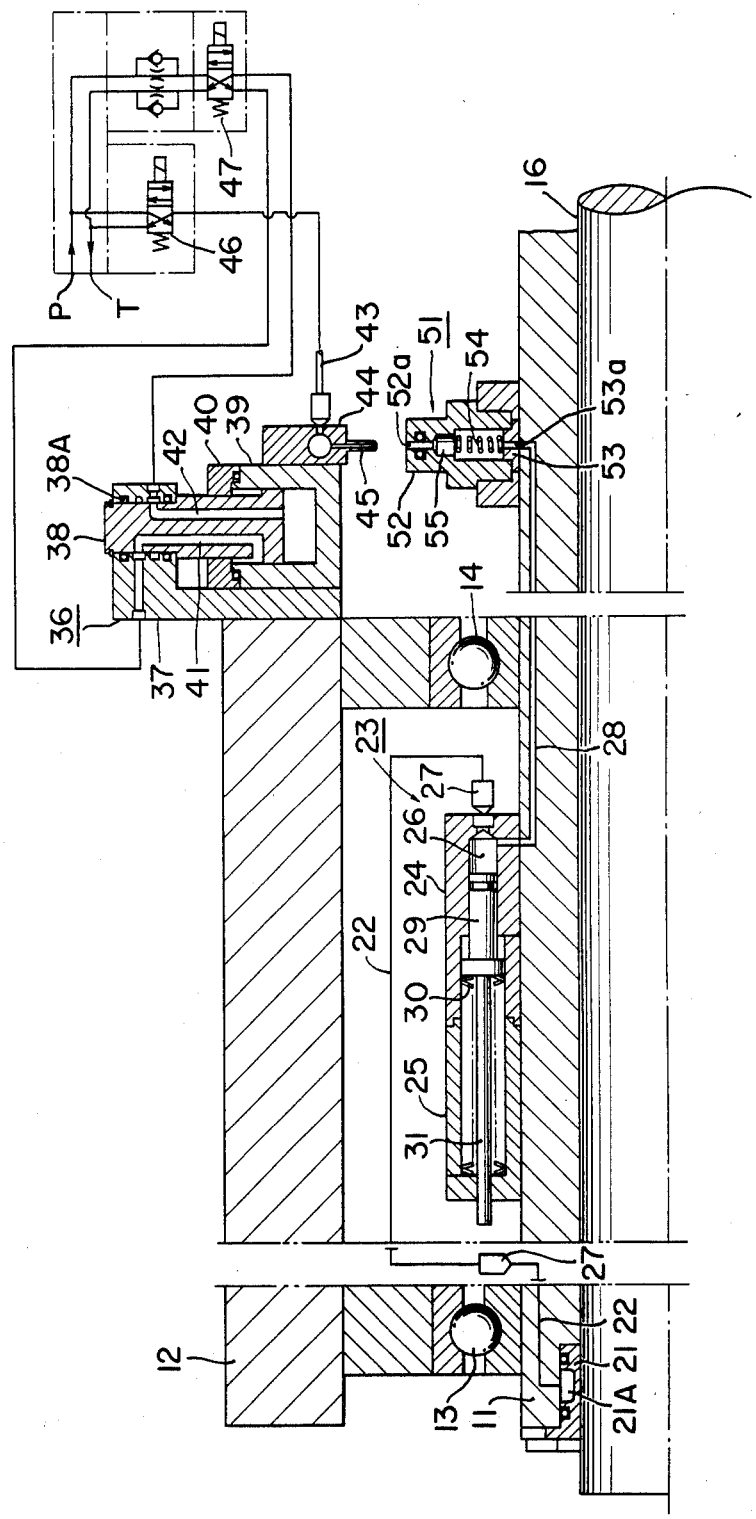

DEVICE FOR CLAMPING BORING BAR IN HORIZONTAL BORING AND MILLING MACHINE

BACKGROUND OF THE INVENTION

This invention relates to a device adapted to be used in a horizontal boring and milling machine having a milling spindle and a boring bar that advances and retracts within the internal bore of the milling spindle.

During the boring operation of ordinary boring and milling machines, the boring bar has not been clamped to the milling spindle, but a braking force is applied to a feed screw of the boring bar for preventing movements of the boring bar relative to the milling spindle, thus presenting drawbacks of displacing the boring bar from the spindle and causing erroneous operations. The displacements of the boring bar are also caused by thermal expansions of the milling spindle and the boring bar, thus enhancing the erroneous operation, reducing the operational capability, and causing fretting corrosions of the machines. For preventing such displacements, a manual clamping device has been proposed but found to be extremely troublesome. An automatic clamping device of a construction comprising a resilient ring interposed between the outer surface of the boring bar and the inner surface of the milling spindle has also been proposed. The resilient ring has an annular recessed portion formed along the outer surface of the same. An oil passage provided with a plunger at an end thereof is extended through the milling spindle to be connected with the recessed portion. When the plunger is depressed for a predetermined distance, oil contained in the recessed portion and the oil passage is pressurized to deform the resilient ring so as to clamp the boring bar onto the milling spindle. The proposed device of the above described construction, however, exhibits a difficulty of substantially reducing the clamping force when air is mixed in the oil.

For eliminating such a difficulty, an improved construction having a fixed ring provided outwardly of the milling spindle has also been proposed. A gap is maintained between the outer surface of the milling spindle and the inner surface of the fixed ring, and an annular groove is formed on the internal surface of the fixed ring. When the boring bar is to be clamped, a pressurized oil is supplied through the fixed ring to the resilient ring provided between the milling spindle and the boring bar. Although this improved device can assure stable clamping of the boring bar, recent trend of increased diameter and rotating speed of the milling spindle inevitably increases the shearing resistance of oil flowing across the gap, thus increasing heat created in the gap, and causing a temperature rise in the milling spindle and the boring bar. Thermal expansion of the milling spindle and the boring bar decreases the precision of the cutting operation.

SUMMARY OF THE INVENTION

An object of the present invention is to provide a device for clamping boring bar in a horizontal boring and milling machine, wherein the above described drawbacks of the conventional devices can be substantially eliminated.

Another object of the invention is to provide a device for clamping boring bar to the milling spindle of the boring and milling machine, wherein the precision of the horizontal milling and boring operations of the machine can be substantially improved and the operations can be stabilized regardless of the simple construction of the clamping device.

According to the present invention, there is provided a device for clamping boring bar in a horizontal boring and milling machine, which comprises a milling spindle rotatably supported by a ram through bearings, a boring bar rotatably and reciprocatably supported in an internal bore of the milling spindle, a resilient clamping ring inserted between the milling spindle and the boring bar and having a recess provided along an outer circumference thereof, a first oil passage extending along a longitudinal axis of the milling spindle to be connected with the recess of the clamping ring, an accumulator having an oil chamber connected with the first oil passage and a second oil passage extending along the longitudinal axis of the milling spindle, and a piston urged toward the oil chamber by a spring,, a receiving unit secured to an outer peripheral portion of the milling spindle in a liquid-tight manner so as to be connected with the second oil passage and including therein a check valve member, and an oil supplying unit secured to the ram, and comprising a cylinder reciprocatable under application of pressurized oil and a needle depending from the cylinder so as to be inserted into the receiving unit.

The invention will be described in detail with reference to the accompanying drawing.

BRIEF DESCRIPTION OF THE DRAWING

The accompanying single drawing is a longitudinal sectional view of a preferred embodiment of the present invention.

DESCRIPTION OF THE PREFERRED EMBODIMENT

Referring now to the single drawing showing a clamping device constituting a preferred embodiment of the invention, the device comprises a milling spindle 11 which is rotatably supported by a ram 12 through bearings 13 and 14 interposed therebetween. A gear driven by a driving mechanism (not shown) is secured to the milling spindle 11 by means of a key (not shown) or the like for rotating the same. In an internal bore of the milling spindle 11 is provided a boring bar 16 coupled with the milling spindle 11 through a key or the like (not shown) so that the bar 16 can be reciprocated along the internal bore by means of a feed mechanism (not shown) which is coupled with the rear end (right end as viewed in the drawing) of the boring bar 16. For assuring precise movements of the boring bar 16, the boring bar 16 is held slidable relative to the spindle 11 with a minimum gap maintained therebetween.

Between the inner surface of the milling spindle 11 and the outer surface of the boring bar 16, and at a position near the forward end thereof, a clamp ring 21 having an annular recess 21A formed along the outer circumference of the same is provided to be received in a mating recess formed in the milling spindle 11. The annular recess 21A is communicated with a first oil passage 22, so that upon reception of a pressurized oil, the ring 21 is deformed so that the boring bar 16 is thereby clamped to the milling spindle 11. The first oil passage 22 is connected to an accumulator 23 fixed to the outer surface of the milling spindle 11. The accumulator 23 comprises two pieces 24 and 25 coupled with each other by bolts and the like (not shown). An oil chamber 26 formed in the rear piece (right piece) 24 is connected as described above with the first oil passage 22 through a coupler 27, and also connected with a second oil passage 28 provided longitudinally through the milling spindle 11. In the oil chamber 26 is provided a piston 29 which is urged rearwardly by a plurality of annular ring shaped springs or a coil spring 30 provided around a piston-rod 31 which extends forwardly to a position opposing a proximity switch (not shown). The proximity switch detects the position of the piston-rod 31 and hence the quantity of oil in the oil chamber 26 which is selected to be a sufficient amount.

At the rear end of the ram 12 is provided an oil supplying unit 36 which supplies oil to the oil chamber 26 through the second oil passage 28.

The oil supplying unit 36 comprises a supporting member 37 fixedly secured to the ram 12. An upper part of the member 37 is coupled with a stationary piston 38 extending downwardly in a liquid tight manner through packings 38A. The oil supplying unit 36 further comprises a cylinder 39 which is slidably mounted on the supporting member 37 while the piston 38 is received in the cylinder 39, and a cylinder cover 40 enclosing the cylinder 39 with the piston 38 penetrating therethrough. Oil passages 41 and 42 are formed through the body of the piston 38 and the supporting member 37 to communicate with oil chambers formed in the cylinder 39 on the upper and lower sides of the piston 38 respectively. An injection device 44 is secured to an outside portion of the cylinder 39 to be connected with a hose 43 which is ordinarily connected with an oil-pressurizing pump circuit P through an electromagnetic transfer valve 46. The lower portion of the injection device 44 is formed into a needle 45 thicker than an ordinary injection needle. The injection device 44 with the needle 45 is descended when pressurized oil is supplied through another electromagnetic transfer valve 47 and the oil passage 42 into the lower chamber of the cylinder 39.

An oil receiving unit 51 receiving the needle 45 will now be described. The unit 51 comprises a valve casing 52 and a plug member 53 which is secured to an outside portion of the milling spindle 11 by means of screws and the like. In an internal space defined by the casing 52 and the plug member 53, which is connected with the second oil passage 28, there are provided a valve member 55 operable as a needle-controlled check valve and a spring 54 one end of which is held by the plug member 53. The spring 54 constantly urges the valve member 55 toward a hole 52a of the casing 52 to close the same.

When the needle 45 of the oil supplying unit 36 is inserted into the hole 52a of the oil receiving unit 51, the needle 45 depresses downward the valve member 55 against the force of the spring 54. Thus, if the pressurized oil supplied through the hose 43 is introduced at this instant into the injection device 44 under the control of the electromagnetic transfer valve 46, the oil is injected through the needle 45 into the valve casing 52 and then delivered through a hole 53a of the plug member 53 to the second oil passage 28 extending through the milling spindle 11.

The clamping device according to the present invention operates as follows.

Prior to the clamping operation, the movement of the milling spindle 11 is stopped, and a constant-position mechanism (not shown) brings the milling spindle 11 to a predetermined angular position wherein the needle 45 of the oil supplying unit 36 is brought into alignment with the needle inserting hole 52a of the oil receiving unit 51.

When pressurized oil is supplied from the pump circuit P to the oil passage 42 in the oil supplying unit 36 after stopping the movement of the spindle 11, the cylinder 39 of the unit 36 is lowered thereby inserting the needle 45 into the needle inserting hole 52a of the unit 51. At this instant, if the electromagnetic transfer valve 46 is held at a position connecting the hose 43 to the pump circuit P, pressurized oil from the pump circuit P flows through the hose 43, needle 45, valve casing 52 of unit 51 into the second oil passage 28 extending through the milling spindle 11. The oil is then supplied through the lower side port into the oil chamber 26 of the accumulator 23, so as to push the piston 29 leftward, and then supplied through the right-end port of the accumulator 23, coupler 27, first oil passage 22 extending through the milling spindle 11, into the recessed portion 21A of the clamp ring 21. The pressurized oil supplied into the recessed portion 21A causes the ring 21 to clamp the boring bar 16 onto the milling spindle 11. When the proximity switch (not shown) detects that the piston 29 and the piston-rod 31 of the accumulator 23 are moved leftward by a predetermined distance against the force of the spring 30, the switch produces a clamp-on signal indicating that the machine is now readily operable for boring a workpiece. The capacity of the accumulator is selected to be sufficient for maintaining the clamped condition for a required time.

When the boring bar 16 is to be unclamped, the milling spindle 11 is stopped at the predetermined position. Then oil supplying unit 36 is operated to insert the needle 45 into the oil receiving unit 51, and simultaneously the electromagnetic transfer valve 46 is transferred to connect the hose 43 with a tank circuit T. Thus, the pressurized oil in the passages 22 and 28 and chamber 26 is returned to the tank circuit T, thus releasing the clamp ring 21 for unclamping the boring bar 16. At this time, the piston 29 and piston-rod 31 of the accumulator 23 are shifted rightward as viewed in the drawing. When the proximity switch detects the displacement of the piston-rod 31, it delivers a clamp-off signal.

According to the clamping device described above, when the oil supplying unit is advanced to insert the needle into the receiving unit after stopping the rotation of the milling spindle, and after transferring another electromagnetic valve 47 connected to the input of the oil supplying unit to the pump circuit P, the pressurized oil from the pump circuit P is supplied through the oil supplying unit to the oil receiving unit and then through the accumulator to the clamp ring so that the boring bar is firmly clamped to the milling spindle. During the above described operation, since the pressurized oil is supplied from the fixed oil supplying unit to the receiving unit secured to the milling spindle while the rotation thereof is stopped, the oil circuit can be established stably and hence the disadvantages of the conventional device such as leaking oil and producing a shearing resistance on both sides of the clamping ring during a period where the pressurized oil is constantly supplied to the rotating milling spindle can be substantially eliminated. Thus the temperature rise of the milling spindle caused frequently in the conventional device can be prevented, and the precision of the cutting operation of the horizontal milling and boring machine can be substantially improved. Furthermore, since the accumulator of a sufficient capacity is provided on the milling spindle, any reduction of oil pressure caused by oil leakage, which is held to a minimum value, can be substantially compensated for, and the clamping force of the clamping device can be maintained for a long period.

Although the invention has been described with respect to a preferred embodiment thereof, it is apparent that various modifications and variations can also be made without departing the spirit and scope of the present invention which is defined by the following claims. For instance, the oil chamber 26 in the accumulator 23 may be formed between a flange portion of the piston-rod 31 and the rearward end of a spring encasing cavity instead of the presently shown position within the rear piece 24.

I claim:

1. A device for clamping a boring bar in a boring and milling machine, comprising:

a milling spindle rotatably supported by a ram through bearings;

a boring bar rotatably and reciprocatably supported in an internal bore of said milling spindle;

a resilient clamping ring inserted between the milling spindle and the boring bar and having a recess provided along an outer circumference thereof;

a first oil passage extending along a longitudinal axis of the milling spindle and connected with said recess of said clamping ring;

an accumulator mounted on an outer surface of said milling spindle and provided with an oil chamber connected with said first oil passage and a second oil passage extending through said milling spindle, and a piston urged toward said oil chamber by a spring;

a receiving unit including a valve casing secured to an outer portion of said milling spindle, an internal space thereof communicating with said second oil passage, a valve member movable in said casing, and a spring urging the valve member toward a needle inserting hole provided for said casing so as to prevent oil from flowing out of said casing through the needle inserting hole; and an oil supply unit including a supporting member secured to one side of said ram, a cylinder reciprocatable in said supporting member under application of pressurized oil, a stationary piston contained in said supporting member, and an oil supply needle secured to said cylinder, said oil supply needle being insertable into and withdrawable from said needle inserting hole during reciprocating movement of said cylinder, said oil supply needle, when inserted into said needle inserting hole, supplying pressurized oil to the oil chamber of said accumulator through said valve member and said second oil passage.

2. A device for clamping boring bar as set forth in claim 1 wherein said resilient clamping ring is provided in an annular recess formed in an internal surface of said milling spindle.

* * * * *